June 23, 1970 C. W. GERST 3,517,309

MICROWAVE SIGNAL PROCESSING APPARATUS

Filed May 28, 1969 2 Sheets-Sheet 1

INVENTOR.
Carl W. Gerst

BY

ATTORNEY

United States Patent Office 3,517,309

Patented June 23, 1970

3,517,309

MICROWAVE SIGNAL PROCESSING APPARATUS

Carl W. Gerst, Skaneatles, N.Y., assignor to Anaren Microwave, Incorporated, Syracuse, N.Y., a corporation of New York Filed May 28, 1969, Ser. No. 828,656
Int. Cl. G01r *23/04;* H01p *5/12;* H03h *7/30*
U.S. Cl. 324—84 15 Claims

ABSTRACT OF THE DISCLOSURE

A microwave system comprises a hybrid matrix having input ports for receiving signals and output ports connected to the input ports of a phase shift operator matrix whose output ports are connected to the input ports of another operator matrix which can reflect signals back to the hybrid matrix.

In one embodiment for measuring the properties of two input signals the hybrid matrix is a correlator matrix while the reflective operator matrix includes detectors and differential amplifiers and a cathode ray tube oscilloscope for displaying the product of the magnitudes of the input voltages of the signals and the differential phase between the signals. In another embodiment of the invention in the form of a multichannel amplifier, the hybrid matrix is a power dividing matrix the reflective operator matrix is an amplifier matrix.

This invention pertains to microwave signal matrices and more particularly to the interconnection of such matrices for microwave signal processing.

There are two types of microwave signal matrices; hybrid matrices and operator matrices.

A hybrid matrix is a passive microwave structure with 2N ports where the 2N ports are divided into 2 sets of N ports each. Each port of one set is completely isolated for every other port of the same set; that is, a signal fed to any port of one set will not exit from a port of the same set. In fact, a signal fed to one port of one set will split out and exit from more than one port of the other set. Generally, but not always, the ports of one set of ports are the input ports of the matrix, while the ports of the other set are the output ports of the matrix. This is the case when signal flow is only in one direction. Sometimes signal flow is bidirectional, or else signals pass through the matrix in one direction and are reflected back through the matrix in the opposite direction. In such a case, the direction of signal flow can be used as a guide to labeling the input and output ports. In addition, the structure is reciprocal and ideally lossless (any losses are unavoidable because of the properties used in realizing the structure, i.e. the resistivity of the conductors). Furthermore, each hybrid matrix has an inverse. That is, if a given hybrid matrix and its inverse are connected in tandem to form a 2N port device, this 2N port device would look like N, parallel, lossless reciprocal transmission lines. Finally, the absolute value of each of the scattering coefficients is either 0 or $$\frac{1}{\sqrt{N}}$$

Mathematically, the hybrid matrix can be represented by an NXN matrix wherein each element $h_{mn}$ is a unit vector indicating phase.

There are three common types of hybrid matrices; the 90° hybrid matrix; the 180° hybrid matrix and the Butler matrix. Another useful type is a correlator matrix.

The 90° hybrid matrix is built up from the 2 x 2 hybrid matrix (90° hybrid)

$$H_2^{90}=\frac{1}{\sqrt{2}}\begin{vmatrix}1 & j\\ j & 1\end{vmatrix}$$

The matrix is realized by a 90° coupler which can be a backward wave coupler or a branch line coupler (3 db hybrids), hereinafter more fully described. Higher order matrices are obtained by forming direct matrix products (mathematically). In other words, higher order 90° matrices are built-up by direct matrix multiplication from a generator which is a 90° hybrid.

In a similar manner, the 180° hybrid matrix is built-up by direct matrix multiplication in terms of the 2 x 2 hybrid matrix (180° hybrid)

$$H_2^{180}=\frac{1}{\sqrt{2}}\begin{vmatrix}1 & 1\\ 1 & =1\end{vmatrix}$$

The matrix is realized by a 180° coupler which can be a "rat-race" or "magic Tee" coupler (3 db hybrid).

The third of the important types of hybrid matrices is the Butler matrix. At present, species of this matrix are the most commonly used in microwave signal processing because in many respects a Butler matrix has properties which resemble quite closely those of the fast Fourier transforms. Mathematically, the $\theta_{mn}$ components of the elements of the Butler matrix can be expressed as $h_{mn}=e^{j\theta}mn$, where $$\theta_{mn}=\frac{2\pi mn}{N}$$

Physically, the desired matrix is realized by interconnecting 3 db hybrids and fixed phase shifters.

Other hybrid matrices can be constructed by combining both 180° hybrids and 90° hybrids. That is, 90° hybrids could be embedded in the larger matrix with a 180° hybrid generator.

An operator matrix has at least N ports. It may have 2N ports divided into a set of N input ports and N output ports. If the device has only N ports, each of the ports is an input and an output port. The operator matrix has the further property that signals received at any one input port will only exit at a given related output port. In other words, each port of one set is connected to one port of another set and isolated from all other ports of each set. Mathematically, the operator matrix can be represented by an N x N matrix wherein the elements $h_{mn}\neq 0$ for $m=n$ and $h_{mn}=0$ for $m\neq n$, i.e. a matrix having non-zero elements only along the main diagonal.

Operator matrices can take many forms such as amplifier matrices, attenuator matrices, phase shift matrices, reflection matrices, scanner matrices, etc.

Because of the analogies between the way the microwave signals are processed by the microwave signal matrices and the manipulations of matrix algebra, it is convenient to represent the interconnected systems of microwave signal matrices as matrix algebra equations just as digital computer logic configurations are represented by Boolean equations.

In most microwave signal processing systems, there are elements which do not have impedances which properly match the impedances of the other components. Such mismatches cause discontinuities in the signal path which result in portions of the signals being reflected back along the path. In many cases these reflections are the bane of the processing system, giving rise to an unwanted signal feedback and standing waves, particularly when the signal is reflected back to the input of the system. One of the greatest source of reflections usually is associated with the signal detection equipment such as diode detectors. Diodes, by their very nature, are notorious reflectors. Another common source of reflections is associated with signal amplification. Microwave transistor amplifiers have input impedances which are difficult to match to the output impedances of the signal transmission paths.

While it may be possible to obtain the desired matches to prevent reflections, the implementation of the required procedures can be overly complicated and costly.

It is accordingly a general object of the invention to minimize the effect of reflections resulting from the interconnection of a hybrid matrix to a reflective type operator matrix or a microwave signal utilization device.

It is another object of the invention to provide means for harmlessly dissipating any reflections resulting from an impedance mismatch of units in a microwave signal processing system.

It is a further object of the invention to shunt reflections caused by a reflective type operator matrix from the signal input ports of a hybrid matrix to other ports of the hybrid matrix which can dissipate microwave energy.

Briefly, the invention contemplates a microwave signal processing apparatus comprising a hybrid matrix connected via a phase shift matrix to a reflective operator matrix. The hybrid matrix includes a plurality of input ports and a plurality of output ports. Some of the input ports are adapted to receive microwave signals for processing, and the other input ports are connected to microwave signal dissipation means. The output ports of the hybrid matrix are connected to the input ports of the phase shift matrix. At least some of the input ports of the phase shift matrix are connected by fixed phase shifters to output ports thereof. The output ports of the phase shift matrix are connected to the input ports of the reflective type operator matrix. The number of fixed phase shifters and their magnitude is chosen so that microwave signals reflected by the operator matrix which pass back through the phase shift matrix and the hybrid matrix are only received at the input ports which are connected to microwave signal dissipation means.

Other objects, the features and advantages of the invention will be apparent from the following detailed description when read with the accompanying drawing which shows by way of example microwave signal processing systems utilizing the invention.

Before going into the detailed description, several conventions should be noted. Although the systems are best realized by using stripline type transmission lines, microstrip or other types of transmission lines or waveguides could be employed. While the ports of the matrices are shown idealized, it should be understood that conventional stripline-to-coaxial line couplings can be employed as well as other lengths of matching stripline. The connections between all elements are shown idealized. However, it should be realized that conventional couplings, coaxial lines or striplines can be employed. In many cases, it is fruitful to connect the elements by striplines which are printed on the substrates from which the couplers are fabricated to form an integrated package.

It will be assumed that wherever possible the couplers and their connecting means have matching impedances and the microwave energy dissipating means have that same matching impedance.

Finally, all mentioned phase shifts are those purposely inserted in the system, it being understood that insertion phase shifts and any phase shifts resulting because of the lengths of the connecting means between the elements have been compensated for and assumed not to exist.

Figure 1:
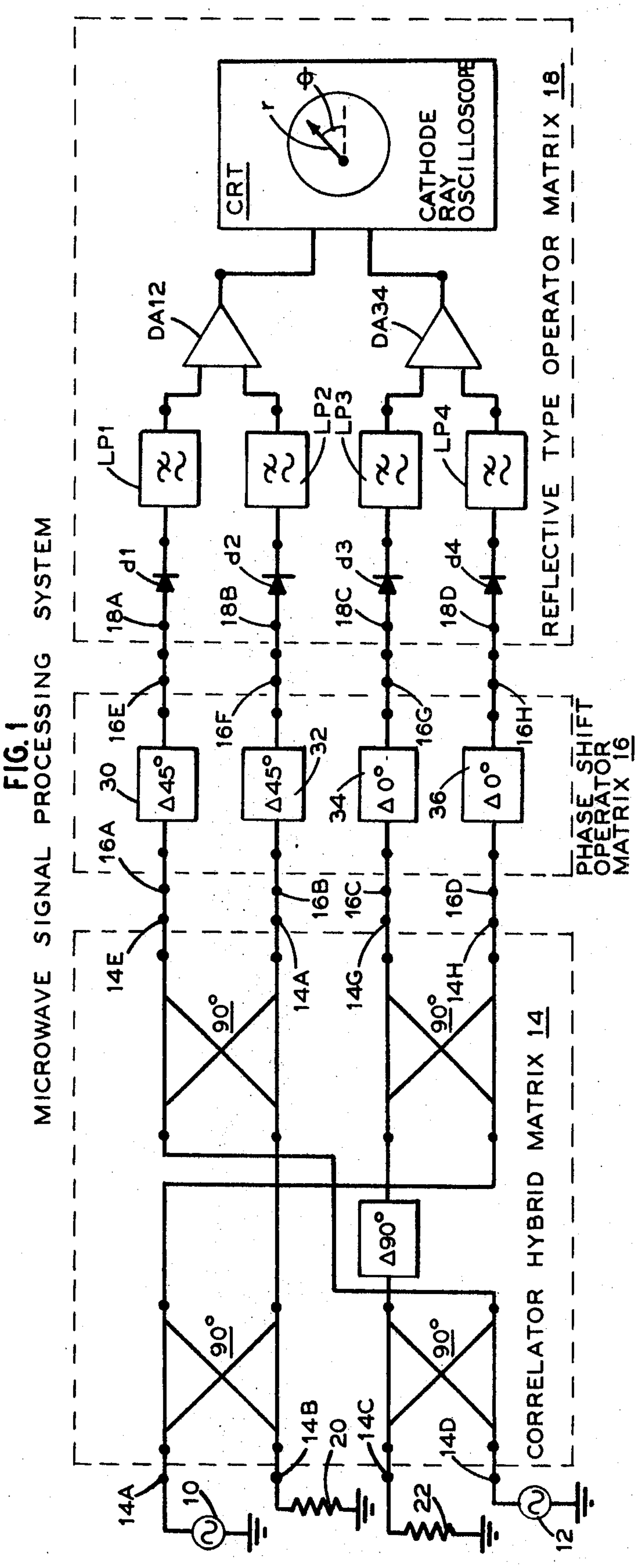
FIG. 1 is a schematic diagram of a microwave signal processing system for measuring the product of the magnitude of the voltages of two microwave signals and the differential phase shift of the two signals.

In FIG. 1, there is shown a microwave signal processing system for giving a visual indication of the product of the magnitude of the voltages of two microwave signals and the phase difference between the signals.

The system comprises the microwave signal sources 10 and 12 connected to correlator matrix 14 (a hybrid matrix) which is connected, via phase shift matrix 16 (an operator matrix), to a reflective type operator matrix 18 which includes means for displaying the desired parameters.

The correlator matrix 14 has four inputs ports 14A, 14B, 14C and 14D and four output ports 14E, 14F, 14G and 14H. The correlator matrix is a hybrid matrix having a transfer function which is represented by the following 4 x 4 mathematical matrix:

$$|C_F|=\frac{1}{2}\begin{vmatrix} 1 & j & j & -1 \\ j & -1 & 1 & j \\ j & 1 & -j & -1 \\ -1 & j & -1 & j \end{vmatrix}$$

for signals transferred from its input ports 14A to 14D to its output ports 14E to 14H.

If signals $a$, $b$, $c$, $d$, or any combination thereof, are fed to the ports 14A, 14B, 14C and 14D, respectively, these signals can be represented by the 1 x 4 mathematical matrix $|B|=|a, b, c, d|$.

In the present case, only ports 14A and 14D receive signals, they are connected to sources 10 and 12 respectively. Ports 14B and 14C are terminated with microwave signal dissipation means such as microwave resistors 20 and 22, each having a resistance equal to the output impedance of the ports 14B and 14C. Therefore $|B_1|=|a, 0, o, d|$.

When the signals from sources 10 and 12 are applied to the input ports of correlator matrix 14, the latter transmits from its output terminals 14E, 14F, 14G, and 14H signals represented by the 1 x 4 matrix $|D|$. Mathematically, the operation can be expressed in matrix algebra as $$|D|=|C_F|\cdot|B_1|$$

The output side of correlator matrix 14 is connected via phase shift matrix 16 to the input ports 18A to 18D of matrix 18. Each of these input ports is connected to the anode of a diode detector $d$1 to $d$4, respectively. For the time being, it is only necessary to know that each diode reflects Γ of its received signal. (where Γ is a complex number, whose amplitude is less than 1). The array of diode detectors can be considered as a 4 x 4 operator matrix (a reflector matrix) represented mathematically as:

$$|R|=\begin{vmatrix} \Gamma & 0 & 0 & 0 \\ 0 & \Gamma & 0 & 0 \\ 0 & 0 & \Gamma & 0 \\ 0 & 0 & 0 & \Gamma \end{vmatrix}$$

Now, if the output ports 14E to 14H of correlator matrix 14 were directly connected to the input ports 18A to 18D, respectively, of operator matrix 18, signals are reflected back to ports 14E to 14H which are represented by the 1 x 4 matrix $|E|$. Mathematically, the operation can be represented in matrix algebra as $|E|=|R|\cdot|D|=|R|\cdot|C_F|\cdot|B_1|$ Now, it should be recalled that a hybrid matrix is a reciprocal device. Therefore, external signals applied to the output ports 14E to 14H (acting as input ports) will result in signals being transmitted from the input ports 14A to 14D (acting as output ports). For this direction of signal transfer the correlator matrix 14 has a transfer function which is represented by the following 4 x 4 mathematical matrix $$|C_B|=\frac{1}{2}\begin{vmatrix} 1 & j & j & -1 \\ j & -1 & 1 & j \\ j & 1 & -j & -1 \\ -1 & j & -1 & j \end{vmatrix}$$

Therefore, these reflected signals pass through correlator matrix 14 and appear at input ports 14A to 14D. These signals can be represented by the 1 x 4 matrix |F|, where $$|F|=|C_B|\cdot|E|=|C_B|\cdot R|\cdot|C_F|\cdot|B_1|$$

$$|F|=f_1,f_2,f_3,f_4|$$

where at least $f_1$ and $f_4$ are non-zero quantities.

Now it should be realized that the signals due to the reflections received at ports 14A and 14D can become input signals because of reflection at ports 14A and 14D. These reflected signals are superimposed on the signals from sources 10 and 12 and a detrimental feedback occurs. This feedback can be prevented if no reflected signals reach ports 14A and 14D, in other words if $$|F|=|F_1|=|0,\ p,\ q,\ o|$$

where $p$ and $q$ can be any value. Mathematically, this means $$|F_1|=|C_B|\cdot|E_1|$$

When this equation is solved for $|E_1|$ it is found that if the signal reflected to port 14E is shifted in phase by 90° ($j$) and the signal reflected to port 14F is phase shifted by 90° ($j$) then the desired result is obtained.

Therefore, if the output ports of the correlator matrix 14 are connected by properly chosen phase shifters to the input ports of matrix 18 one can obtain the desired input signals represented by the 1 x 4 matrix $|E_{n1}|$, indicated above. Before choosing these phase shifters, one more point must be realized. A signal exiting at output port, say port 14E travels to input port 18A and part is reflected back to output port 14E. Therefore, if a phase shifter is used to connect these two ports it need only have one half the desired value because half the desired phase shift will be obtained during the forward transmission and the other half in the reflected transmission.

Accordingly, the required phase shifts can be obtained by the phase shift matrix 16 (an operator matrix) which can be represented by the 4 x 4 mathematical matrix:

$$|P_1|=\begin{vmatrix} \frac{1+j}{\sqrt{2}} & 0 & 0 & 0 \\ 0 & \frac{1+j}{\sqrt{2}} & 0 & 0 \\ 0 & 0 & 1 & 0 \\ 0 & 0 & 0 & 1 \end{vmatrix}$$

In summary, the system so far described comprises a source of input signals (microwave signal sources 10 and 12) represented by matrix $|B_1|$, a correlator matrix 14 represented by matrix $|C_F|$ when signals travel through it in the forward direction, and by matrix $|C_B|$ when signals travel through it in the opposite direction, a phase shift matrix 16 represented by matrix |P| and reflection matrix 18 represented by matrix |R|.

In operation, signals from sources 10 and 12 pass through correlator matrix 14 and appear at ports 14E to 14H according to the following equation:

$$|D|=|C_F||B_1|$$

The signals at ports 14E to 14H are fed to ports 16A to 16D respectively of the phase shift matrix 16 and appear at the output ports 16E to 16H, respectively thereof, according to the following equation:

$$|G|=|P|\cdot|D|=|P|\cdot|C_F|\cdot|B_1|$$

The signals at ports 18A to 18D represented by matrix |G| enter matrix 18 for final processing, hereinafter more fully described. However, a portion of each signal is reflected by one of the diodes $d1$ to $d4$ back to ports 16E to 16H of phase shift matrix 16 and can be represented by the following equation:

$$|H|=|R|\cdot|G|$$

The signals at ports 16E to 16H pass through phase shift matrix 16 and via ports 16A to 16D thereof to ports 14E to 14H of correlator matrix 14 according to the following equation:

$$|H_1|=|P|\cdot|H|$$

The signals received at ports 14E to 14H pass through correlator matrix 14 to the ports 14A to 14D, thereof, according to the following equation:

$$|F_1|=|C_B|\cdot|H_1|=|0_{j\,d\Gamma,a\Gamma,0}|$$

where:

0=Reflected signal at port 14A
$d\Gamma$=Reflected signal at port 14B
$a\Gamma$=Reflected signal at port 14C
0=Reflected signal at port 14D

It should be noted that no signal is fed back to ports 14A and 14D, hence the phase shift matrix 16 has eliminated undesired feedback; and the signals at ports 14B and 14C are dissipated by resistors 20 and 22 respectively.

Before proceeding with the processing of the signals received by matrix 18, the composition of each of the matrices 14, 16 and 18 will be described.

The correlator hybrid matrix comprises four 90° hybrids and a 90° phase shifter which are interconnected to get the desired forward transfer function.

Now consider phase shift matrix 16 which is an operator matrix and is represented by:

$$|P_1|=\begin{vmatrix} \frac{1+j}{\sqrt{2}} & 0 & 0 & 0 \\ 0 & \frac{1+j}{\sqrt{2}} & 0 & 0 \\ 0 & 0 & 1 & 0 \\ 0 & 0 & 0 & 1 \end{vmatrix}$$

The only entries are on the main diagonal. Each entry indicates one element connecting one input port to one output port, i.e. the entry $p_{11}$ indicates the element connecting port 16A to port 16E; entry $p_{22}$ the element connecting port 16B to port 16F, etc. Since entry $$p_{11}=\frac{1+j}{\sqrt{2}}$$

this indicates a 45° phase shifter, the entry $$p_{22}=\frac{1+j}{\sqrt{2}}$$

indicating a 45° phase shifter, the entry $p_{33}=1$ indicating no phase shift and the entry $p_{44}=1$ indicating no phase shift. Accordingly, 45° phase shifter 30 connects port 16A to port 16E, 45° phase shifter 32 connects port 16B to port 16F, 0° phase shifter 34 connects port 16C to port 16G, and 0° phase shifter 36 connects to port 16D to port 16H. This procedure is typical for all phase shift matrices.

The portion of matrix 18 which gave rise to the reflections was also an operator matrix. In this case, the actual components were given and the mathematical matrix derived therefrom. However, such an operator matrix falls under the general class of attenuator matrices. Such matrices have the form:

$$|G|=\begin{vmatrix} g_{11} & 0 & 0 & 0 \\ 0 & g_{22} & 0 & 0 \\ 0 & 0 & g_{33} & 0 \\ 0 & 0 & 0 & g_{44} \end{vmatrix}$$

where $g_{11}$ is a complex number. Just as with the shift matrix each non-zero entry characterizes an element connecting one input port to one output port (for the reflection matrice, they are the same ports). If $g_{11}$ is a real fraction, an appropriate attenuator is used; if $g_{11}$ is a real number greater than 1 an amplifier having a voltage gain equal to the numeric value of $g_{11}$ is used. If, however, $g_{11}$ were a complex number, then a phase shifter, in addition to the attenuator or amplifier, would be used to satisfy the criteria.

The remainder of matrix 18 processes the signals received at the input ports 18A to 18D. Each of the input ports is connected via a rectifying diode and a low pass filter to one input of a differential amplifier. In particular, input port 18A is connected via diode *d*1 and low pass filter LP1 to one input of differential amplifier DA12. Input port 18B is connected via diode *d*2 and low pass filter LP2 to the other input of differential amplifier DA12. Input port 18C is connected via diode *d*3 and low pass filter LP3 to one input of differential amplifier DA34. And input port 18D is connected via diode *d*4 and low pass filter LP4 to the other input of differential amplifier DA34.

The output of differential amplifier DA12 is connected to the horizontal deflection circuits of cathode ray tube oscilloscope CRT and the output of differential amplifier DA34 is connected to the vertical deflection circuits of the oscilloscope.

In operation, the signals at input ports 18A and 18B, after rectification and low pass filtering (to remove the carrier), are subtracted by differential amplifier DA12 which transmits a signal representing the difference of the modulating waveforms of the signals received at ports 18A and 18B. Similarly, for the signals received at ports 18C and 18D. The two difference signals when applied to the deflection circuits of the oscilloscope, cause a display which is the radius of a circle. The length of the radius $r$ is proportional to the product of the amplitudes of the voltages of the signals from sources 10 and 12, while the angular displacement $\theta$ of the radius from the horizontal indicates the difference in phase between the signals from sources 10 and 12.

Figure 2:
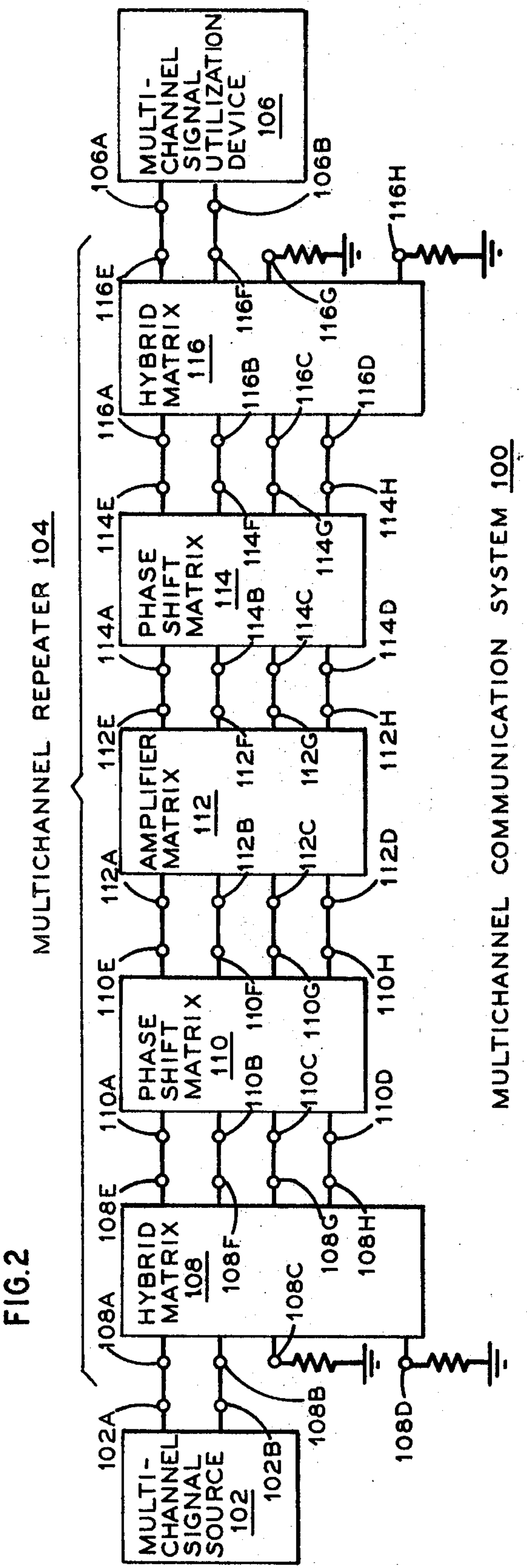
FIG. 2 is the schematic diagram of multichannel communications system using a multichannel repeater incorporating the invention, with FIGS. 2A, 2B and 2C showing details of the matrices employed therein.

In FIG. 2 there is shown a multichannel communications system 100 such as may be used, by way of example, in a community antenna television distribution system or a long haul microwave link. A multichannel signal source 102 is connected by way of a multichannel repeater 104 to a multichannel signal utilization device 106. By a multichannel signal source is meant one or a plurality of sources which produce a plurality of signals. Although the system is a two channel system, the invention is applicable to systems with greater number of channels.

Repeater 104 comprises the serially connected hybrid matrix 108, the phase shift matrix 110, the amplifier matrix 112, the phase shift matrix 114 and the hybrid matrix 116. The phase shift matrix 110, the amplifier matrix 112 and the phase shift matrix 114 are operator matrices. In addition, the amplifier matrix is such that it will generate reflections which are sent back to signal source 102 in response to signals received therefrom, if phase shift matrix 110 were not present.

Figure 2C:
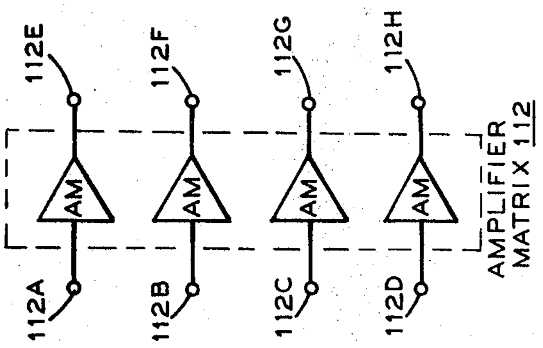
Figure 2B:
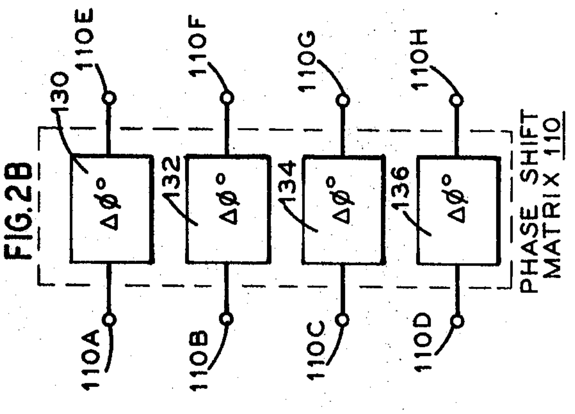
Figure 2A:
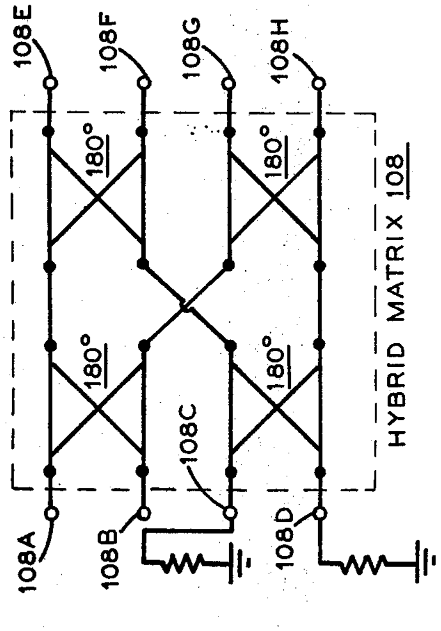

Hybrid matrix 108 is a power divider matrix comprising four interconnected 180° couplers (see FIG. 2A). Matrix 108 has four input ports 108A to 108D and four output ports 108E to 108H. Ports 108A and 108B are connected to separate output channels 102A and 102B respectively, of source 102. Ports 108C and 108D are grounded via resistors having resistances equal to the output impedances of these ports to provide microwave signal dissipation means.

If signals $a$ and $b$ are respectively transmitted from ports 102A and 102B, the input signals to the ports 108A to 108B can be represented by the 1 x 4 matrix $$|K|=|a, b, 0, 0|$$

In addition, for signals passing from ports 108A to 108D, to ports 108E to 108F, the hybrid matrix 108 can be represented by the 4 x 4 mathematical matrix $$|S_F|=\begin{vmatrix}1 & 1 & 1 & 1\\ 1 & 1 & -1 & -1\\ 1 & -1 & 1 & -1\\ 1 & -1 & -1 & 1\end{vmatrix}$$

Therefore, when source 102 applies signals to the input ports of hybrid matrix 108, the signals transmitted from its output ports can be represented by the 1 x 4 matrix $$|L|=|S_F|\cdot|K|$$

The signals at the output ports 108E to 108H are applied to the input ports 110A to 110D, respectively, of phase shift matrix 110. Phase shift matrix 110 is an operator matrix which is represented by the 4 x 4 mathematical matrix:

$$|P_2|=\begin{vmatrix}\frac{1+j}{\sqrt{2}} & 0 & 0 & 0\\ 0 & 1 & 0 & 0\\ 0 & 0 & \frac{1+j}{\sqrt{2}} & 0\\ 0 & 0 & 0 & 1\end{vmatrix}$$

(In FIG. 2B is shown the physical realization of the matrix.)

The signals transmitted from the output ports 110E to 110H respectively are represented by the 1 x 4 mathematical matrix |M| where:

$$|M|=|P_2|\cdot|L|$$

The signals from output ports 110E to 110H are applied to the input ports 112A to 112D respectively of amplifier matrix 112. A portion of each signal will be reflected because of transistor amplifiers in the matrix 112. Therefore, so far as reflections are concerned, matrix 112 can be characterized by the 4 x 4 mathematical matrix:

$$|R|=\begin{vmatrix}\Gamma & 0 & 0 & 0\\ 0 & \Gamma & 0 & 0\\ 0 & 0 & \Gamma & 0\\ 0 & 0 & 0 & \Gamma\end{vmatrix}$$

and the signals reflected back to ports 110E to 110H are represented by the 1 x 4 matrix |N| where $|N|=|R|\cdot|M|$. The ports 110A to 110E will then transmit to the ports 108E to 108H of hybrid matrix 108, signals represented by the 1 x 4 mathematical matrix |Q|, where:

$$|Q|=|P_2|\cdot|N|$$

When the signals represented by matrix |Q| are applied to the ports 108E to 108H, the hybrid matrix 108 is represented by the 4 x 4 matrix $|S_B|$, where:

$$|S_B|=\begin{vmatrix}1 & 1 & 1 & 1\\ 1 & 1 & -1 & -1\\ 1 & -1 & 1 & -1\\ 1 & -1 & -1 & 1\end{vmatrix}$$

Therefore, the signals transmitted from ports 108A to 108D are represented by the 1 x 4 matrix |T|, where $$|T|=|S_B|\cdot|Q|=|0, 0, \Gamma_a, \Gamma_b|$$

Thus, it can be seen that signals are reflected back to only ports 108C and 108D where they are dissipated by the resistors and no signals are reflected back to ports 108A and 108B.

Now returning to the signals applied to the input ports of amplifier matrix 112. The unreflected ports pass through the matrix to the output ports 112E to 112H. In such a case, the matrix 112 is represented by the 4 x 4 mathematical matrix:

$$|A|=\begin{vmatrix}g & 0 & 0 & 0\\ 0 & g & 0 & 0\\ 0 & 0 & g & 0\\ 0 & 0 & 0 & g\end{vmatrix}$$

where $g$ is the amplification factor. (The physical realization of the matrix is shown in FIG. 2C.) Hence the signals at output ports 112E to 112H can be represented by the 1 x 4 mathematical matrix |U| where $$|U|=|A|\cdot|M|.$$

These signals are applied to the input ports 114A to 114D of phase shift matrix 114 which can be represented by the 4 x 4 mathematical matrix $|P_3|$ where $$|P_3|=\begin{vmatrix}\frac{1-j}{\sqrt{2}} & 0 & 0 & 0\\ 0 & 1 & 0 & 0\\ 0 & 0 & \frac{1-j}{\sqrt{2}} & 0\\ 0 & 0 & 0 & 1\end{vmatrix}$$

Physically, phase shift matrix 114 is the same as phase shift matrix 110 of FIG. 2B, with the following exceptions; the plus 45° phase shift $$\frac{1+j}{\sqrt{2}}$$

has been replaced with a minus 45° phase shift $$\frac{1-j}{\sqrt{2}}$$

Therefore, the signals at output ports 114E to 114H are represented by a 1 x 4 mathematical matrix $$|V|=P_3|\cdot|U|$$

These signals are applied to the input ports 116A to 116E of hybrid matrix 116. Now the hybrid matrix 116 and the hybrid matrix 108 are the same, but the input ports 116A to 116D act the same as the output ports 108E to 108H. Therefore, hybrid matrix is represented by the mathematical matrix $S_B$ (see above), i.e. the matrix representing hybrid matrix 108 for signals traveling from ports 108E to 108H, to ports 108A to 108D.

Therefore, the signals transmitted from ports 116E to 116H are represented by the 1 x 4 mathematical matrix $$|W|=|S_B|\cdot|V|=|ga,\ gb,\ 0,\ 0|$$

These signals are applied to the input ports of utilization device 106, where the signal *ga* is applied to input port 106A and the signal *gb* is applied to input port 106B Therefore, the signal *a*, transmitted from port 102A of source 102, is amplified by a factor *g* and received at port 106A of utilization device 106, and the signal *b*, transmitted from port 102B of source 102, is amplified by a factor *g* and received at port 106B of utilization device 106.

Several facts are worth noting. (1) Phase shift matrix 110 prevented reflections from entering the source channels. In particular, if phase shift network 110 were absent, then the following equation holds:

$$|T|=|S_B|\cdot|R|\cdot|S_F|\cdot|K|=|\Gamma_a,\ \Gamma_b,\ 0,\ 0|$$

(2) Amplifiers matrix 112 adds reliability to the repeater because half of the amplifiers therein must fail before there are serious complications. (3) Phase shot matrix 114 compensates for phase shifts introduced by phase shift matrix 110 so that the proper phase relation exists among the signals entering hybrid matrix 116.

The various building blocks of the matrices will now be described.

Figure 3:
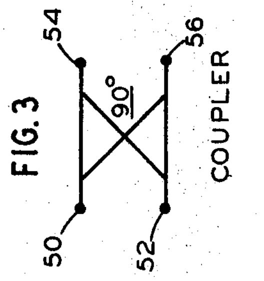

In FIG. 3 there is a shown the symbol for a 90° coupler. The convention employed is that terminals 50 and 52 are isolated from each other as are terminals 54 and 56. A signal received at any terminal is transmitted to the horizontally opposite terminal without any phase shift and to the diagonally opposite terminal with a 90° phase shift in the voltage components. In addition, the signal power splits equally between the two paths with each terminal receiving half the power. For 180° coupler, the power splits equally but the signals are 180° out of phase. Both types of couplers are well known in the art. The 90° coupler is preferably a stripline device while the 180° coupler can be either a stripline device or a lumped parameter device.

Figure 4:
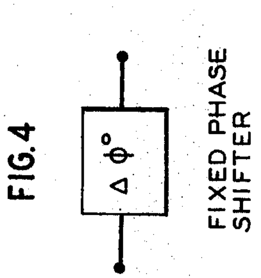

The fixed phase shifter of FIG. 4 can also be a stripline device such as a Shiffman phase shifter.

Figure 6:
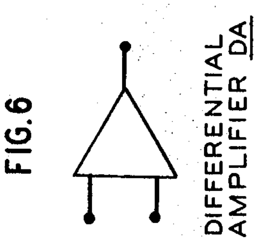
Figure 5:
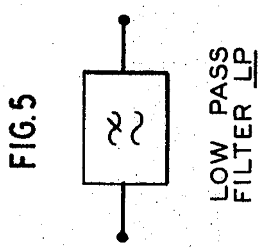

Low pass filter LP of FIG. 5 can be a conventional low pass filter. Differential amplifier DA of FIG. 6 can be a conventional differential amplifier.

Figure 7:
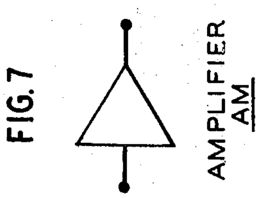
FIGS. 3 to 7 are symbolic representations of the components utilized in the systems of FIGS. 1 and 2.

Amplifier AM of FIG. 7 can be a conventional microwave signal amplifier employing transistors.

There has thus been shown improved microwave signal processing apparatus which by the use of phase shift matrices prevents reflections from returning to the inputs of the systems and causing unwanted feedback signals.

While only a limited number of embodiments of the invention have been shown and described in detail, there will now be obvious to those skilled in the art many modifications and variations satisfying many or all of the objects of the invention but which do not depart from the spirit thereof, as defined by the appended claims.

What is claimed is:

1. Apparatus for comparing two microwave signals comprising a correlator hybrid matrix having four input ports and four output ports; a source of one of the microwave signals connected to a first of said input ports; a source of the other of said microwave signals connected to a second of said input ports; a non-reflective microwave signal dissipation means connected to the other of said input ports; a phase shift matrix including four input ports and four output ports; means for connecting each of the output ports of said correlator matrix to a different one of the input ports of said phase shift matrix, respectively; and a comparison means comprising four unilateral conducting devices, each having an input and an output, the input of each unilateral conducting device being connected to a different output port of said phase shift matrix, respectively; differential signal operator means having input means connected to the outputs of said unilateral conducting devices and an output means; and signal registering means, connected to said output means, for registering the comparison of the two microwave signals.

2. Microwave signal processing apparatus comprising: a hybrid matrix including a plurality of input ports and a plurality of output ports, some of said input ports being adapted to receive microwave signals, and microwave signal dissipation means connected to the other of said input ports; a phase-shift matrix including a plurality of input ports, a plurality of output ports and a plurality of connecting means, each of said connecting means connecting one input port to a different output port, at least one of said connecting means being a fixed phase shift element; means for connecting each of the input ports of said phase-shift matrix to one of the output ports of said hybrid matrix, respectively; a microwave signal utilization means including a plurality of input ports, and means connected to said input ports which reflect microwave signals; and means for connecting each of the input ports of said microwave signal utilization means to one of the output ports of said phase-shift matrix, respectively; the number of phase shift elements and the magnitude of the phase shift introduced by each element being such that microwave signals reflected by said microwave signal utilization means which pass back through said phase shift matrix and said hybrid matrix are received at only the input ports of the latter which are connected to said microwave signal dissipation means.

3. The microwave signal processing apparatus of claim 2 wherein said hybrid matrix is a correlator matrix including four input ports and four output ports, the first input port being adapted to receive a signal represented by a value 2*a*, the second and third input ports being connected to said signal dissipation means, and the fourth input port being adapted to receive a signal represented by a value 2*d*, means for interconnecting said input ports and said output ports such that the first output port transmits a signal represented by the value $(-a+d)$, the second output port transmits a signal represented by the value $j(a+d)$, the third output port transmits a signal represented by the value $j(a+jd)$, and the fourth output port transmits a signal represented by the value $(a-jd)$, where $j$ indicates a 90° phase shift.

4. The microwave signal processing apparatus of claim 3 wherein said microwave signal utilization means comprises four signal detector means, each having an input terminal and an output terminal and four input ports, each of said input ports being connected to one of said input terminals respectively, and signal processing means connected to the output terminals of said signal detector means.

5. The microwave signal processing apparatus of claim 4 wherein said signal processing means comprises first and second differential amplifier means each having first and second input means and an output means, and further comprising means for connecting the output terminals of the first and second detector means to the first and second input means, respectively, of said first differential amplifier means, and means for connecting the output terminals of the third and fourth detector means to the first and second input means, respectively, of said second detector means.

6. The microwave signal processing apparatus of claim 5 wherein the means for connecting the output terminals of said detector means to the input means of said differential amplifiers comprises low pass filter means.

7. The microwave signal processing apparatus of claim 5 wherein the first, second, third and fourth input ports of said microwave signal utilization means are connected to the input terminals of said first, second, third and fourth detector means, respectively; said phase shift matrix comprises at least four input and four output ports; means for connecting the first, second, third and fourth output ports of said phase shift matrix to the first, second, third and fourth input ports, respectively, of said microwave signal utilization means; and means for connecting the first, second, third and fourth output ports, respectively, of said correlator matrix to the first, second, third and fourth input ports, respectively, of said phase shift matrix.

8. The microwave signal processing apparatus of claim 7 wherein the fixed phase shift elements connecting the first and second input ports to the first and second output ports, respectively, of said phase shift matrix introduce 45° differential phase shifts in the signals passing therethrough with respect to the signals passing from the third and fourth input ports to the third and fourth output ports, respectively, of said phase shift matrix.

9. The microwave signal processing apparatus of claim 2 wherein said microwave signal utilization means comprises an amplifier matrix having a plurality of input and output ports.

10. The microwave signal processing apparatus of claim 9 wherein said amplifier matrix comprises a plurality of microwave signal amplifiers each having an input terminal and an output terminal, means for connecting the input terminal of each of said amplifiers to one of said input ports respectively, and means for connecting the output terminal of each of said amplifiers to one of said output ports, respectively.

11. The microwave signal processing apparatus of claim 9 wherein said microwave signal utilization means further comprises another hybrid matrix having a plurality of input and output ports, and means for connecting one of the input ports of said other hybrid matrix to one of the output ports of said amplifier matrix, respectively.

12. The microwave signal processing apparatus of claim 11 wherein said connecting means comprises another phase shift matrix.

13. The microwave signal processing apparatus of claim 2 wherein: said hybrid matrix comprises a first hybrid matrix having 2N input ports and 2N output ports wherein a first N input ports are adapted to receive separate microwave signals and the second N input ports are connected to said microwave signal dissipation means; said phase shift matrix has 2N input ports and 2N output ports and means for connecting each of the 2N input ports of said phase shift matrix to one of the 2N output ports, respectively, of said first hybrid matrix; and said microwave signal utilization means comprises an amplifier matrix including 2N input ports, 2N output ports and 2N microwave signal amplifiers each of said signal amplifiers connecting one of the 2N input ports to one of the 2N output ports, respectively.

14. The microwave signal processing apparatus of claim 13 wherein said microwave signal utilization means further comprises a second hybrid matrix which is operationally the inverse of said first hybrid matrix and has 2N input ports and 2N output ports, a first N of said output ports being adapted to transmit microwave signals, the second N of said output ports being connected to microwave signal dissipation means; and means for connecting each of the 2N input ports of said second hybrid matrix to one of the 2N output ports, respectively, of said amplifier matrix.

15. The microwave signal processing apparatus of claim 14 wherein said connecting means comprises another phase shift matrix comprising 2N input ports and 2N output ports wherein each of the input ports of said other phase shift matrix is connected to one of the output ports of said amplifier matrix, respectively, and one of the output ports of said other phase shift matrix is connected to one of the input ports of said other hybrid matrix, respectively.

References Cited

UNITED STATES PATENTS 3,423,688 1/1969 Seidel ---------------- 330—53
3,444,475 5/1969 Seidel ------------- 333—11 X HERMAN KARL SAALBACH, Primary Examiner M. NUSSBAUM, Assistant Examiner U.S. Cl. X.R.

324—95; 333—11, 31